R. HOFFMAN.
AUTOMATIC WATER HEATER.
APPLICATION FILED JAN. 25, 1909.

928,757.

Patented July 20, 1909.
3 SHEETS—SHEET 1.

Witnesses
W. A. Williams
A. W. Ehrling.

Inventor
Rudolph Hoffman
By A. Pattison,
Attorney

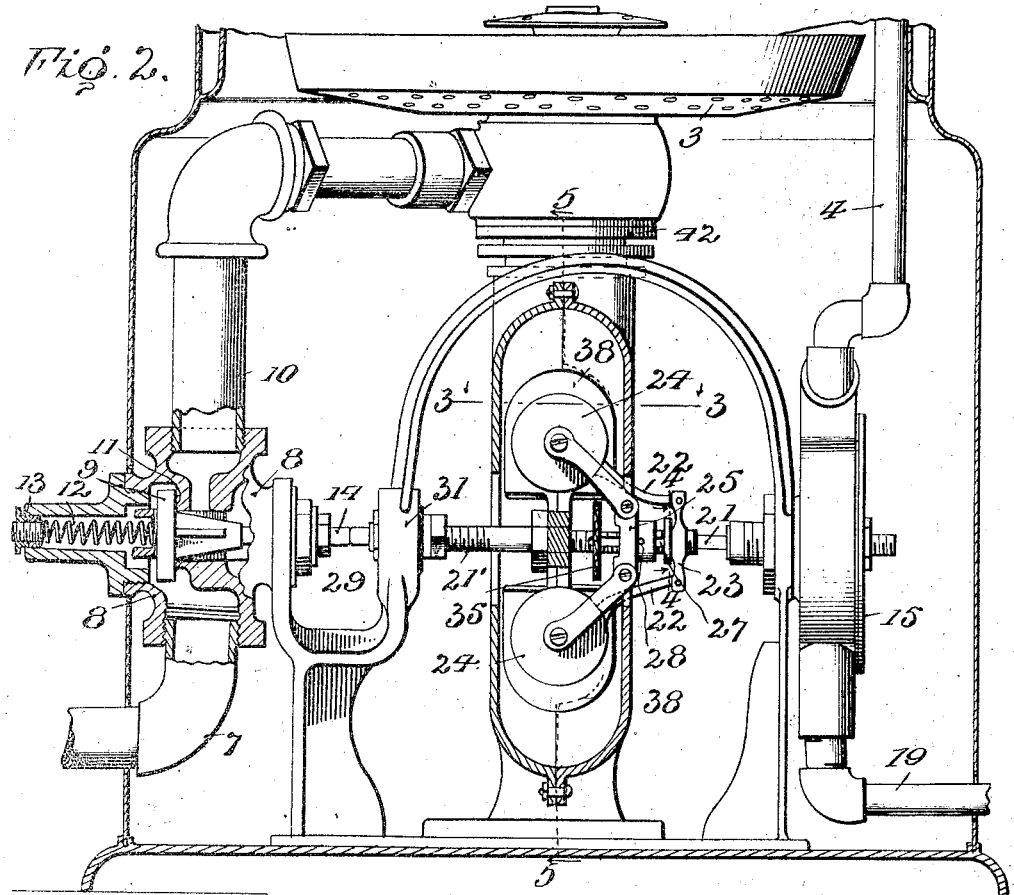
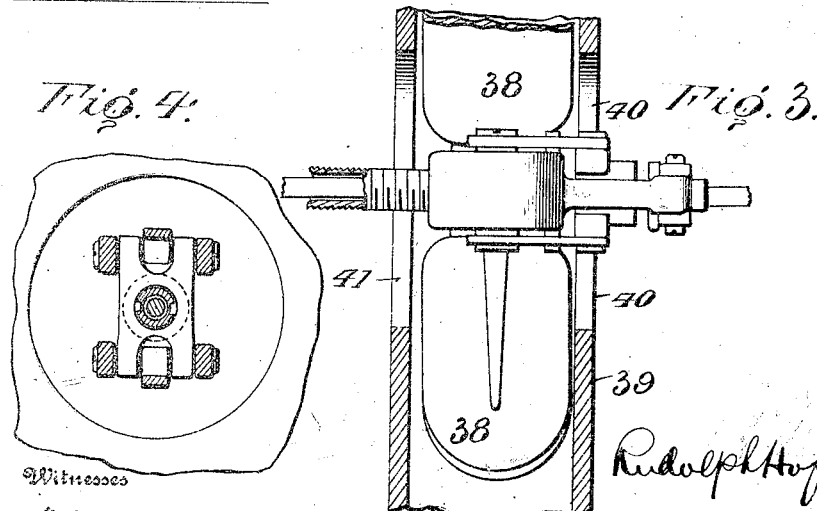

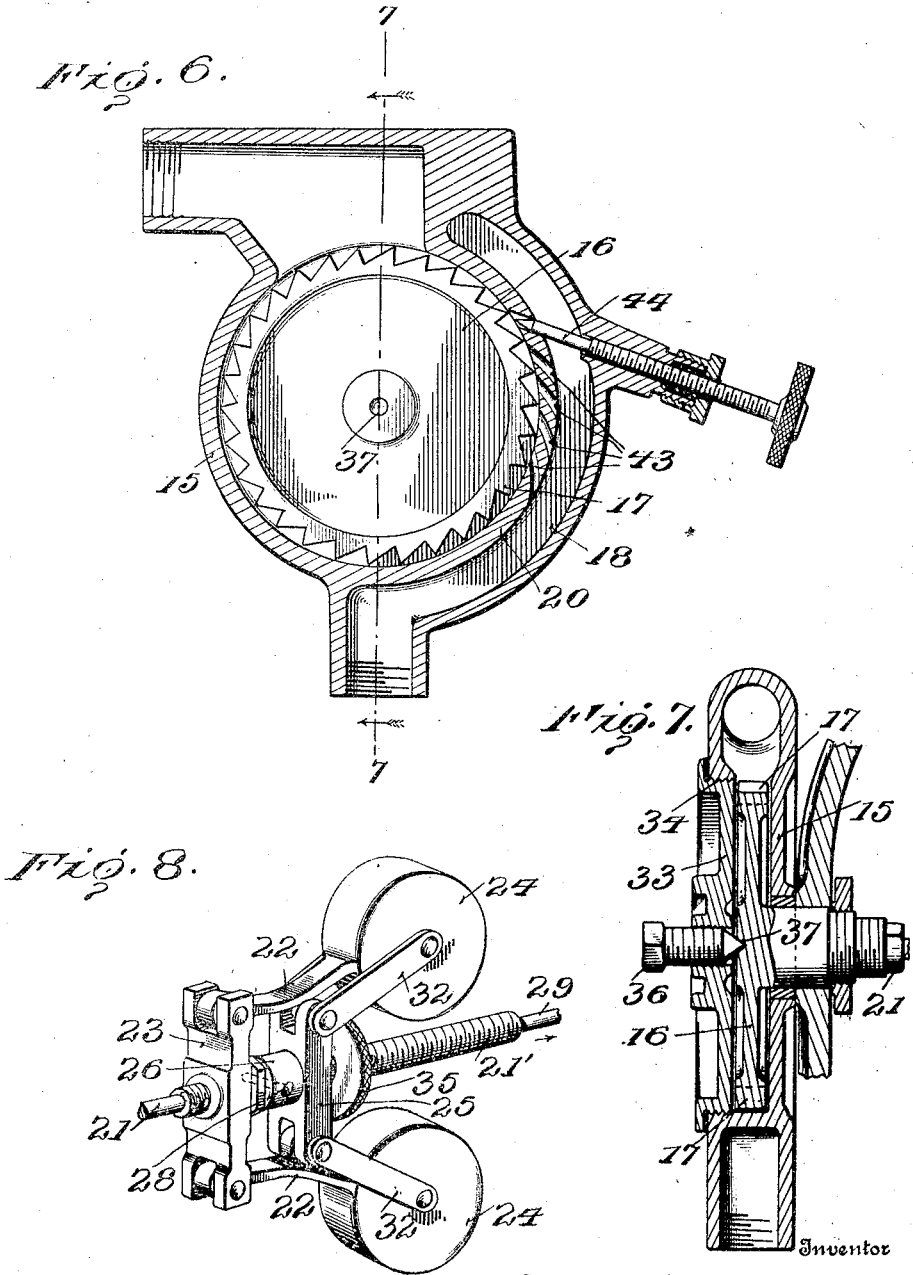

UNITED STATES PATENT OFFICE.

RUDOLPH HOFFMAN, OF LORAIN, OHIO, ASSIGNOR TO AMERICAN STOVE COMPANY, OF ST. LOUIS, MISSOURI, A CORPORATION OF NEW JERSEY.

AUTOMATIC WATER-HEATER.

No. 928,757.  Specification of Letters Patent.  Patented July 20, 1909.

Application filed January 26, 1909. Serial No. 474,120.

*To all whom it may concern:*

Be it known that I, RUDOLPH HOFFMAN, a citizen of the United States, residing at Lorain, in the county of Lorain and State of Ohio, have invented certain new and useful Improvements in Automatic Water-Heaters, of which the following is a specification, reference being had therein to the accompanying drawing.

This invention relates to improvements in automatic water heaters, and particularly pertains to an automatic water heater for domestic use, though it is capable of other uses, the object being to cause the water to be automatically heated when it is drawn from an outlet or supply faucet. Water heaters for this purpose have heretofore been made in which the fuel supply has either been controlled automatically by the water supply, or by a thermostat which controlled the fuel supply through variations of temperature in the water, or in which both the water-controlled and the thermostat-controlled fuel supply have been embodied in a single apparatus.

The present invention pertains to an automatic water heater in which there is a continuously rotating member actuated by the flow of the water, and this member carries means for controlling the fuel supply according to the volume of water being drawn within a predetermined period of time, and in which the rotating element also provides a forced draft for the burner, whereby an increased heating efficiency is obtained, and in which the force or volume of the forced draft is automatically regulated according to the fuel and water supplies.

Figure 1:
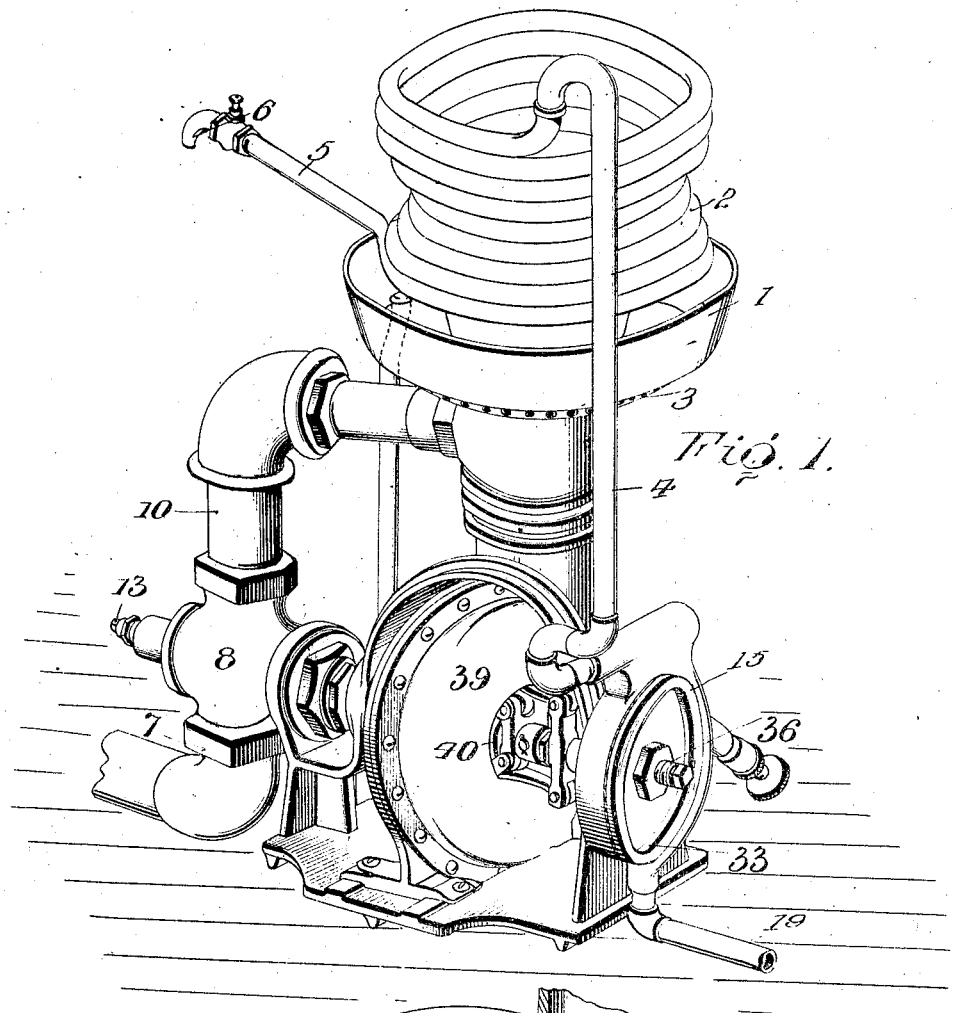
Figure 5:
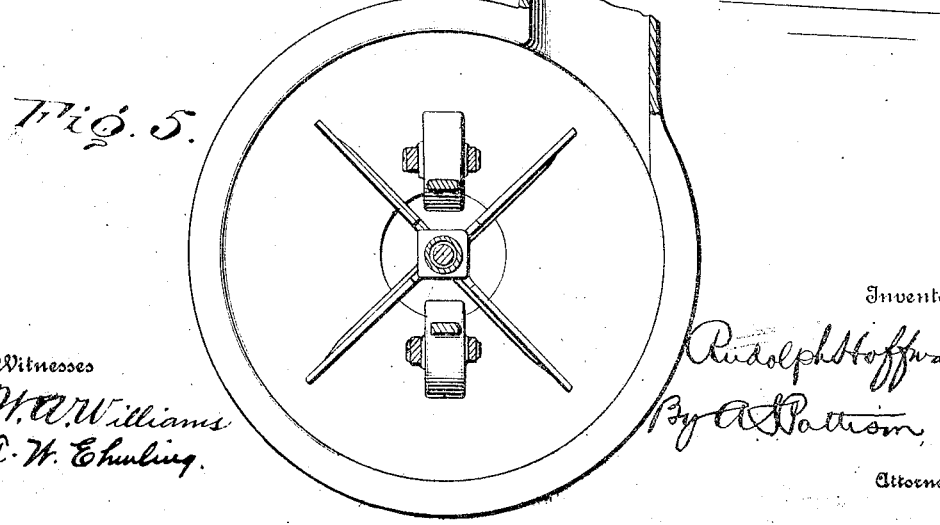

In the accompanying drawings, Figure 1, is a perspective view of an apparatus embodying the present invention. Fig. 2, is a sectional view taken longitudinal the apparatus, partly shown in side elevation. Fig. 3, is a horizontal, sectional view on the line 3—3 of Fig. 2. Fig. 4, is a vertical sectional view on the line 4—4 of Fig. 2. Fig. 5, is a vertical, sectional view on the line 5—5 of Fig. 2. Fig. 6, is a vertical, sectional view through the water motor and its casing. Fig. 7, is a vertical section on the line 7—7 of Fig. 6. Fig. 8, is a detached, perspective view of the fuel supply governor.

My invention is here shown as applied to an automatic heater for domestic uses, and in which, 1, indicates the casing of any suitable form of water receptacle through which the water to be heated passes. The preferred form is that of a coiled pipe 2 which is suitably arranged in a casing 1 the lower portion of which is shown in Fig. 2, and is located above the burner 3. This burner may be of any desired form, the form of burner and water receptacle here shown being intended more of a conventional character rather than of any particular form to which my invention is related or limited. The essential feature of the water receptacle 2 is that the water should enter it, flow through it, and out to the source of hot water supply. As here shown, the water enters the heating tube or receptacle 2 through a suitable pipe 4, and passes out through an outlet 5 to the hot water supply faucet or faucets 6. It will be understood by those skilled in this art that the faucet or faucets 6 are located at the desired points in the house, such, for instance, as the kitchen, laundry, bathroom, laboratory, etc.

A main gas supply 7 is provided, and communicates with a suitable housing 8 in which is located any suitable form of gas or fuel-controlling valve 9. The gas or fuel supply passes from this housing 8 through a suitable pipe 10 to the burner 3. The form of fuel-controlling valve 9 here shown is intended to be of a conventional character, rather than of any specific form, for my improvement is capable of being used with other forms of gas or fuel-controlling valves. The form here shown for the purpose of describing my invention, which coöperates with a fuel-controlling valve, is of the reciprocating type, and is adapted to close against a suitable seat 11, and a spring 12 of any desired form is used to normally seat the valve. The tension of this spring may be regulated by means of an adjusting screw-rod 13. This valve 9, as here shown, is provided with a stem 14 which projects through and beyond the housing 8, as clearly shown in Fig. 2.

The pipe 4 through which the water is fed to the heating receptacle or tube 2, has its opposite end in communication with the casing 15, in which casing a rotating water wheel or motor 16 of suitable form is located. The form here shown is of the well known impact motor and consists of a disk or wheel having on its periphery a plurality of ratchet-shaped water blades 17. Surrounding a portion of the motor casing is a supply conduit or passage-way 18, and the water enters this passage-way from the supply or water main through a pipe 19, and through the inner wall 20 of the passage-way 18, and is projected against the water motor for the purpose of rotating it.

In operation, when water is drawn from any of the hot water faucets 6, it is caused to flow through the water motor and cause it to rotate as it passes to the water-heating receptacle or tube 2, so that the drawing of water from any of the hot water faucets causes the motor to rotate, and the rotation of this motor opens up or unseats the gas or fuel-controlling valve 9 in a manner which will now be explained.

Secured to the motor 16 is a governor shaft 21, and this shaft carries a governor (to be presently explained) which controls the opening and closing of the fuel or gas-controlled valve 9. Any suitable form of centrifugally-operated governor may be used for controlling the gas or fuel valve 9. The form here shown for accomplishing this consists of the arms 22 which are pivoted at one of their ends to a suitable cross-head 23 which is attached to and revolved by the motor 16. The outer ends of these arms 22 carry suitable weights 24, and these weights are connected with a cross-head 25 which revolves with the governor-shaft 21, but is capable of being reciprocated thereon. This cross-head 25 has a suitable sleeve 26, and passing through this sleeve and through a slot 27 in the governor shaft 21, is a pin 28. The governor shaft 21 is hollow beginning at about the cross-head 23, and from that point to its opposite end. Passing loosely through the hollow portion of the governor-shaft is a rod 29 which has its end projecting beyond the end of the hollow governor-shaft, and adapted to engage the projecting end 14 of the fuel-controlling valve stem, while the opposite end of the rod rests against the cross-pin 28. For convenience the hollow portion of the governor-shaft is designated by the numeral 21', and the end thereof is suitably journaled in a bearing 31.

The operation of the governor is as follows:—When any of the faucets 6 is open water is caused to flow through the motor 16 and cause it to rotate. In turn, the governor-shaft 21 and 21' is caused to rotate, and carries with it the governor previously described. The rotation of the governor-shaft causes the balls or weights 24 to be centrifugally thrown out, and this outward movement of the balls causes the cross-head 25 to be moved through the medium of the links 32 which have their ends pivoted respectively to the ends of the cross-head and to the weights. This movement of the cross-head 25 carries the cross-pin 28 in engagement with the adjacent end of the rod 29 and forces the rod outward against the stem 14 of the fuel-controlling valve 9, which unseats the valve 9 and permits the gas to flow to the burner. The burner is lighted by the well known pilot light (not shown), and the water as it passes through the coil or receptacle 2 is heated. If the faucet 6 is opened wide the motor is caused to revolve rapidly and the balls or weights 24 will be thrown outward to the limit of their outward movement, and the fuel-controlling valve 9 will be wide open, so that a full supply of fuel passes to the burner. If, on the other hand, the faucet is only partly opened, the motor and the governor-shaft revolve correspondingly slow and the weights are not thrown so far out, so that the gas valve 9 is only partially opened and there is only a partial supply of fuel to the burner. The supply of water to the motor will be so adjusted that when the faucet 6 is full open there will be a sufficient supply of fuel and a sufficient heat furnished by the burner to keep the water to the required temperature. This being adjusted, the supply of fuel and the heat furnished by the burner is automatically controlled when the water supply is cut down to any point between the full supply and the complete closing of the faucet. When the faucet is completely closed the flow of water through the motor is stopped, which causes the motor to stop, and the governor-shaft also stops, so that the gas or fuel-controlling valve 9 is no longer held from its seat, but is seated by the spring 12 and the supply of gas to the burner completely cut off. From the foregoing, it will be seen that the amount of fuel supplied to the burner, and thereby the amount of heat furnished by the burner, is automatically controlled by the passage of the water through the faucet, which will prevent any over-heating of the burner, or of the water tube or receptacle 2, and completely cuts off the burner when the flow is stopped. It will also be observed that any sticking of the motor, or failure of it to operate, either when the faucet 6 is open or when it is closed, will not cause any injury by overheating the water tubes or receptacle, because the instant the motor ceases to work the governor assumes the position to cause or permit the closing of the gas valve, and thereby completely cuts off the supply of fuel to the heater.

For the purpose of permitting ready access to the motor, for the purpose of cleaning it or correcting any irregularities in its operation, the outer side or end 33 of the motor case 15 is removable, since it screws therein as shown at 34, Fig. 7, and when this is removed access to the motor is at once obtained. For the purpose of regulating the maximum outward movement of the weights 24, a regulating nut 35 is screw-threaded on the outer side of the hollow portion 21' of the governor-shaft, which therefore will limit the movement of the cross-head 25 and thereby the outward movement of the weights 24, and this movement is readily regulated by the turning of the nut 35 on the governor-shaft. As shown in Fig. 7, the removable side 33 of the motor case 15 carries an adjustable cone-bearing 36 which is adapted to engage a cone-recess 37 concentrically made in the motor disk 16, and serves to form a centering bearing for the motor disk.

The water motor in addition to controlling the fuel supply to the burner through the medium of the governor, already described, also serves to supply the air for the burner 3 by means of a rotatable fan which is connected with and driven by the motor through the governor-shaft 21. The air for the burner is therefore conveyed thereto under pressure created by the fan which constitutes a forced draft, and this increases the heating efficiency of the burner. The fan also increases the forced draft as the fuel supply is increased, and decreases the forced draft as the fuel supply is decreased, thus automatically feeding the proper amount of air and the proper forced draft according to the amount of fuel fed to the burner, and this is accomplished automatically by the single element—namely, the water-driven motor. The forced draft is provided by the fan-arms 38 which radiate from the governor-shaft 21, and these fan-arms are located in a suitable fan-housing 39. This fan-housing has the inlet openings 40 and 41 through which the air enters the housing, and it has the outlet opening 42 which communicates with the burner and with the fuel supply 10, so that the air is mixed with the fuel as it is fed to the burner and forces the fuel with the proper amount of air for combustion through the burner, creating, as aforesaid, a forced-draft burner. The fan and its housing constitutes what may be termed a blower for supplying air to the fuel and carrying the fuel and the air under pressure through the burner. This blower effect increases the heating efficiency of the burner, as is well known. The faster the governor-shaft rotates the wider the gas or fuel valve 9 is open, and the faster the fan operates the more air is forced to the burner. Briefly, the fuel supply and blower effect is automatically increased and diminished in exact proportion and ratio to the increase and diminishing of the fuel supply to the burner, and both the forced draft and the fuel supply are controlled by the amount of water which is passing through the heating coil or receptacle 2, and this in turn is controlled automatically by the faucet 6. That is to say, the operator in turning the faucet 6 simultaneously and automatically causes the water motor to control the fuel supply and the air supply to the burner in proportion to the amount of water which is passing through the heater and the faucet.

The essential features of the present invention are capable of being embodied in various mechanical forms, one of which is herein illustrated and described, but I wish it understood that these may be varied and modified without departing from the broad inventive idea.

I show in Fig. 6 the inner wall 20 of the motor casing 15 as provided with several water outlet passages 43 which extend at an angle to direct the escaping water against the ratchet-shaped paddles of the motor wheel 16, and one or more of these passages may be controlled by an externally-operated valve 44 which will enable the apparatus to be adjusted according to the water pressure of the locality in which the device is being used.

Having thus described my invention, what I claim and desire to secure by Letters Patent, is:—

1. In a water heater, the combination of a water receptacle having an inlet and an outlet conduit, a heating burner for said receptacle, a fuel supply for the said burner, a continuously rotating water motor in said conduit and actuated by the passage of water therethrough, and means controlled by the said rotary motor adapted to control the fuel supply according to the speed of said motor.

2. A water heater comprising a water receptacle having an inlet and an outlet conduit, a rotary motor in one of said conduits, a burner for the said heater, a fuel supply for said burner, and centrifugally-actuated means connected with the said motor and adapted to act upon and control the fuel supply to the said burner according to the rotary speed of the said motor.

3. A water heater comprising a water receptacle having an inlet and an outlet conduit, a rotary motor in one of said conduits, a burner for the said heater, a fuel supply for the said burner, a centrifugally-operated governor connected with the said motor and adapted to control the said fuel supply of the said burner according to the rotary speed of the said motor.

4. A water heater comprising a water receptacle having an inlet and an outlet conduit, a rotary motor in communication with said conduits and continuously rotated by the flow of water through the conduit, a burner for the said heater, a fuel supply for the said burner, a fuel controlling valve for said fuel supply, a governor-shaft operated by the said motor, a governor carried by the said shaft, the governor operatively connected with the said fuel valve and adapted to open it more or less in proportion to the amount of water passing through the said heater conduit.

5. In a water heater, the combination of a water receptacle having an inlet and an outlet conduit, a rotary water motor in communication with said conduits, a burner for said heater, a gas supply for the said burner, an air-blowing device in communication with the said burner and operatively connected with and actuated by the said motor, and means controlled by the rotary motor and controlling the said gas supply.

6. In a water heater, the combination of a water receptacle having an inlet and an outlet conduit, a rotating water motor in one of said conduits and actuated by the passage of the water therethrough, a burner for said heater, a fuel supply for said burner, a rotatable member operated by the said motor, and a governor carried by and having a controlling movement independent of the said rotary member and adapted to control the fuel supply to the burner according to the speed of the motor.

7. A water heater comprising a water receptacle having an inlet and an outlet conduit, a water motor in communication with one of said conduits and actuated by the passage of the water therethrough, a rotatable member connected with and actuated by the said motor, a fuel supply controller and an air-blowing device for the burner, the fuel controller and the blower both being connected with and actuated by the said motor whereby the fuel supply and the air supply to the burner are automatically controlled by the speed of the said motor.

8. A water heater comprising a water receptacle having an inlet and an outlet conduit, a rotary water motor in one of the conduits and actuated by the flow of water therethrough, a heating burner for said receptacle, a fuel supply for said burner, a valve movable independent of the motor and controlling said fuel supply, and a rotating controller actuated by the motor and adapted to open the independent valve more or less according to the speed of the motor.

9. A water heater comprising a water receptacle having an inlet and outlet conduit, a rotary motor in one of the conduits and actuated by the flow of water therethrough, a heating burner for the receptacle, a fuel supply for the burner, a controlling valve for the fuel supply movable independent of the motor, and a rotatable and reciprocating governor for the said valve actuated by the said motor.

10. A water heater comprising a water receptacle having an inlet and outlet conduit, a rotary motor in one of said conduits actuated by the flow of water therethrough, a heating burner for the receptacle, a fuel supply for the burner, a burner air blower and a fuel supply controller both actuated by the said motor.

11. A water heater comprising a water receptacle having an inlet and outlet conduit, a rotary motor in one of said conduits and actuated by the flow of water therethrough, a heating burner for the receptacle, a fuel supply for the burner, the water having a shaft, a burner air blower and a fuel supply controller, both of which are carried by the motor shaft.

In testimony whereof I affix my signature in presence of two witnesses.

RUDOLPH HOFFMAN.

Witnesses:
F. LAUBMIRE,
W. G. SHORT.